(12) United States Patent
Duff et al.

(10) Patent No.: US 8,436,856 B1
(45) Date of Patent: May 7, 2013

(54) SYSTEMS AND METHODS FOR MIXING THE EXECUTION ORDER OF SHADING LANGUAGE CODE

(75) Inventors: Thomas Douglas Selkirk Duff, Berkeley, CA (US); Robert L. Cook, San Anselmo, CA (US)

(73) Assignee: Pixar, Emeryville, CA (US)

( * ) Notice: Subject to any disclaimer, the term of this patent is extended or adjusted under 35 U.S.C. 154(b) by 803 days.

(21) Appl. No.: 12/614,325

(22) Filed: Nov. 6, 2009

(51) Int. Cl.
*G06T 15/50* (2011.01)

(52) U.S. Cl.
USPC ........... 345/426; 345/423; 345/601; 345/602; 348/237; 348/246; 348/247; 382/243

(58) Field of Classification Search ................. 345/423, 345/426, 601, 602; 348/237, 246, 247; 382/243
See application file for complete search history.

(56) References Cited

U.S. PATENT DOCUMENTS 7,853,092 B2 * 12/2010 Akenine-Moller et al. .. 382/243
8,049,760 B2 * 11/2011 Jiao et al. ...................... 345/505
8,259,198 B2 * 9/2012 Cote et al. ..................... 348/246

* cited by examiner

*Primary Examiner* — Kimbinh T Nguyen
(74) *Attorney, Agent, or Firm* — Kilpatrick Townsend & Stockton LLP

(57) ABSTRACT

A shader can include a series of instructions, among which are horizontal instructions and vertical instructions. Executing such shader for rendering animation information may mean many redundant computations on millions of graphic data points. Thus, vertical instructions are separated out from horizontal instructions and executed in a vertical manner, thereby reducing rendering time and cache space used during the process. That is, a block of instructions is recursively subdivided until a number of instructions that are to be executed in a horizontal manner are approximately minimized in each sub-block. All of the identified vertical sub-blocks can process each data point individually and independently from other data points, thereby achieving various advantages, including, but not limited to, temporary processing, index processing, efficient caching and the like.

19 Claims, 7 Drawing Sheets

SYSTEMS AND METHODS FOR MIXING THE EXECUTION ORDER OF SHADING LANGUAGE CODE

BACKGROUND

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In typical shader languages, a user programmer can use surface attribute functions to define the values of attributes of surfaces in three-dimensional space. Such surface attribute functions can be evaluated at any point on the surface to provide corresponding attribute values at that point on the surface. Attributes of surfaces can include optical properties of a surface, such as color, transparency, reflectivity, and refractivity. Attributes can also include visibility or occlusion information; artistically or procedurally generated texture data in one, two, three, or more dimensions; shadow generation information; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of complex user-defined shader programs, ray tracing programs, animation or modeling programs, or simulation programs.

There are some problems with most existing rendering processes, such as visual complexity, motion blur, speed and memory limitation. In particular, the process of rendering an image or frame of animation can be a very time-consuming process. Thus, computations in a shader are analyzed to find a way to reduce the rendering time. One conventional technique may be pipelining shader operations on each data point in a grid, using parallel processing or the like, thereby saving computation time and increasing cache efficiency. However, some shader operations should be implemented on data points in a certain order and thus cannot be processed in a parallel process manner. For example, if a calculation on a data point "A" depends on a result of another calculation on another data point "B", such calculations need to be implemented in a specified order. Further, the result of the calculation on the data point "B" occupies cache or memory space for some time since the result cannot be discarded until the data point A is subsequently calculated. If such a calculation is included in a shader, other calculations in the shader need to be implemented on data points in the specified order for an accurate calculation. This consumes unnecessarily large cache space and slows the rendering process down.

Accordingly, what is desired are improved methods and apparatus for solving some of the problems discussed above. Additionally, what is desired are improved methods and apparatus for reducing some of the drawbacks discussed above.

SUMMARY

A system and method are provided for executing mixed instructions having different types without sacrificing computational efficiency. Conventionally, when there is a horizontal instruction mixed in with vertical instructions in a shader, each instruction in the shader is treated as a horizontal instruction for an accurate calculation. Executing horizontal instructions is very expensive and time consuming. Moreover, executing a horizontal instruction for rendering animation information may mean many redundant computations on millions of graphic data points. Thus, in some embodiments, a series of instructions in a shader is divided into several vertical and horizontal sub-blocks until each horizontal sub-block includes an approximately minimum number of instructions. Vertical sub-blocks can be executed in such a way that the execution can get the benefits and advantages of temporary processing, index calculation, pipelining, caching, or the like.

In accordance with an embodiment, a method for executing a group of calculations on an array of data records is provided. The method includes executing a first set of calculations from the group and executing a second set of calculations from the group where the first set has a vertical calculation type and the second set has a horizontal calculation type. When the second set having a horizontal calculation type is executed, a calculation from the second set is executed on each data record from the array, one data record at a time, before executing a next calculation from the second set. After the calculation is applied to the data, an output of the calculation is stored along with information about the data record. The stored output is used for executing the calculation to other data records selected from the array of data records. Likewise, when the first set having a vertical calculation type is executed, a calculation from the first set is applied to the array of records in parallel.

In accordance with another embodiment, a method for executing a block of calculations on indexed data points is provided. The block of calculations includes at least one vertical calculation and at least one horizontal calculation. The method includes detecting a horizontal portion in the block and dividing the block into a vertical sub-block and a horizontal sub-block using the horizontal portion as a dividing border. The method further includes, if a horizontal sub-block includes at least one vertical calculation, dividing the sub-block. Information including the calculation type of each sub-block may be stored. Each sub-block on the indexed data points is executed in accordance with the calculation type associated with the sub-block in accordance with an execution order specified in the block. In one aspect, if the horizontal sub-block includes a vertical portion and a horizontal portion, the horizontal sub-block is divided further into a vertical sub-block and a horizontal sub-block. If the block starts with the detected horizontal portion, the method includes detecting a vertical portion that follows the horizontal portion; and dividing the block into two horizontal sub-blocks using the vertical portion as a dividing border.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF EXEMPLARY EMBODIMENTS

Figure 1A:
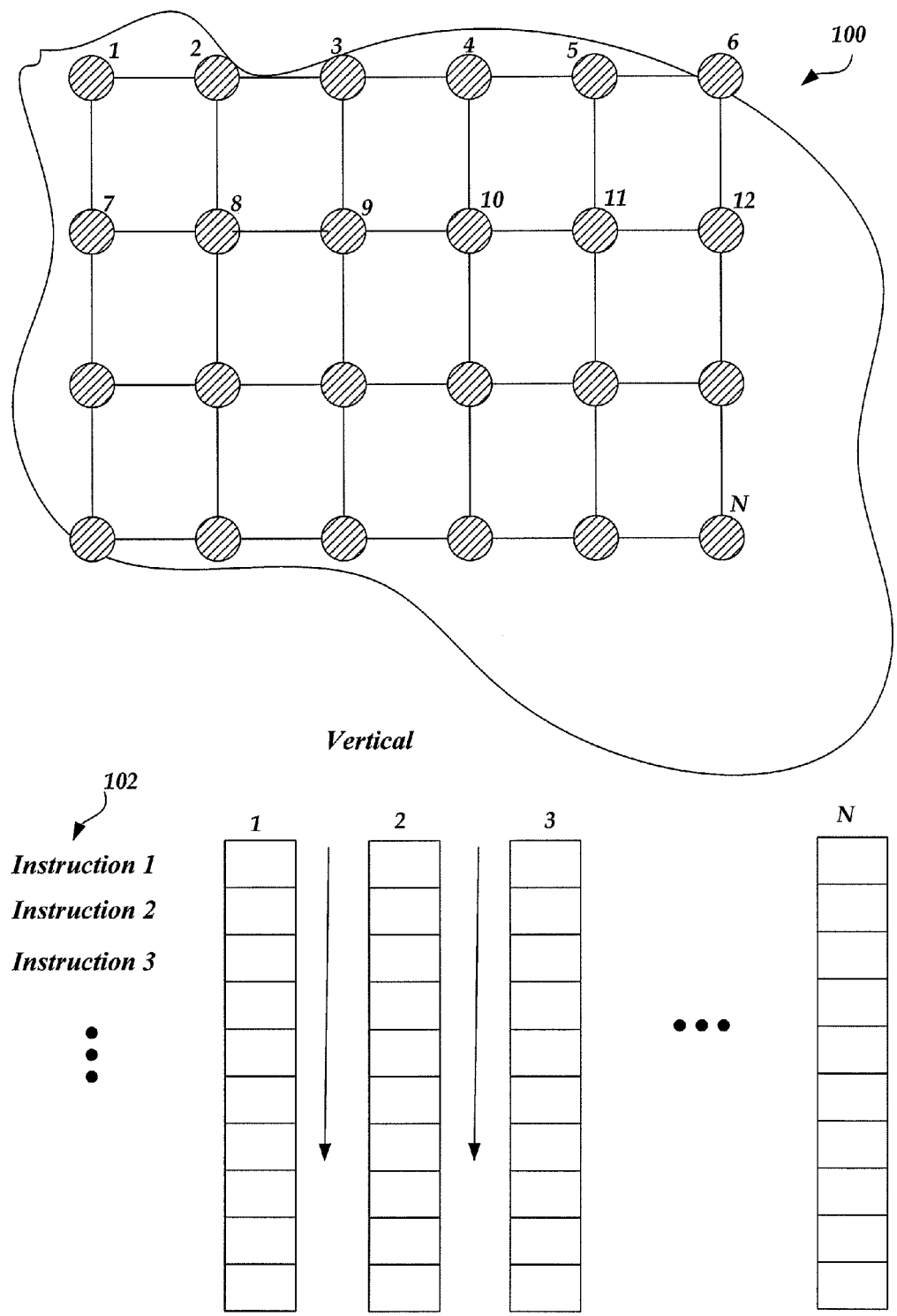
FIGS. 1A and 1B are pictorial diagrams of a grid having data points [1-N] that are to be executed in a vertical manner and a horizontal manner respectively, which may be used to practice embodiments of the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

In some embodiments, instructions in a shader are divided into several sub-blocks of instructions which are executed in accordance with an execution order specified in the shader. Each sub-block is categorized as a "vertical" or "horizontal" sub-block based on a way of execution of instructions within the sub-block. A term "vertical," as used herein, refers to a way of executing instructions where the sequence of instructions can be executed independently on each data point in an array of data points. In one embodiment, a series of vertical instructions can be executed on an individual data point in an array until the individual data point has a final result from the series of vertical calculations. Each data point (that includes a set of data) can be processed individually and independently from other data points. Thus, if instructions are executed in a vertical manner on an array of data points, various advantages, including, but not limited to, temporary processing, index processing, efficient caching and the like are achieved. Further, a loop-overhead can be avoided or reduced. As such, the vertical calculations or instructions can get benefits and advantages from pipelining, parallel processing or the like. A term "horizontal", as used herein, refers to a way of executing instructions where an individual instruction executed at one data point in an array uses as input the results of a previous instruction executed at one or more other data points in the array. A horizontal calculation is implemented across the data points, one data point at a time, before a next calculation is executed on any data point in the array. In some cases, if an instruction is horizontal, a result from the instruction on one data point may be necessary for executing a subsequent instruction on other data points and thus the results from the instruction are stored in memory. Horizontal calculations cannot get benefits or advantages of pipelining or multi-threaded parallel processing. Horizontal calculations tend to be very expensive and consume a large cache space or memory space.

In some embodiments, at the time of executing instructions on data points, the system obtains information about sub-blocks and executes each sub-block in accordance with the calculation category of each sub-block. For example, if the sub-block is vertical, each instruction in the sub-block is implemented in a vertical way. Likewise, if the sub-block is horizontal, each instruction in the sub-block is implemented in a horizontal way. In this manner, a series of instructions that includes mixed calculation categories can be implemented without sacrificing computational and cache-space efficiency due to presence of a horizontal calculation.

In one embodiment, in a shading process, an object may be diced or divided into polygons called micropolygons equal to or smaller than the pixel size. In some embodiments, high-level primitives of an image are used to implicitly specify geometric primitives of the image. The shader system obtains an input primitive of the patch of image and divides the input primitive into polygons called micropolygons equal to or smaller than the pixel size. The input primitive may be divided into smaller primitives if the input primitive is not small enough to process. Subsequently, the small primitive (or sub-primitive) may be diced so that the small primitive is converted into a common data format, called a "grid." A "grid," as used herein, refers to a tessellation of the primitive into a rectangular array of quadrilaterals facets known as micropolygons. The vertices of theses facets are the computer graphics data points that may be shaded. Each grid retains all of the input primitive's attributes, and any primitive vertex variables that were attached to the primitive have been correctly interpolated onto every vertex in the grid. The computer graphics data points (vertices) of the grid are then passed into the shading system to be shaded. Various shaders, including displacement shaders, surface shaders, and light shaders, may be evaluated in a particular order by the shading system. In general, a shader is designed to work on all of the data points in a grid.

Some shader systems gather up all the data points. Shaders have several quantities, such as position, normal, temp values. Shaders operate on each data point. As will be appreciated, the vast majority of shaders written for image production are surface shaders. Attributes of surfaces can include optical properties of a surface, such as color, transparency, reflectivity, and refractivity. The goal of a surface shader is to compute the resulting color, opacity, and the position at a particular computer graphics data point.

Consider exemplary instructions as follows:
instruction 1: A=N*(L−P)
instruction 2: C=C+1
Inputs: array of data points [1-n].
As will be appreciated, the above described instructions are vertical instructions, which can be implemented on each data point independently from other data points. Referring now to FIG. 1A, a grid having data points [1-N] is shown. As shown, for each data point, a series of instructions 102 can be processed in parallel if the instructions are vertical instructions that can be executed in a uniform way, regardless of results from other data points.

Figure 1B:
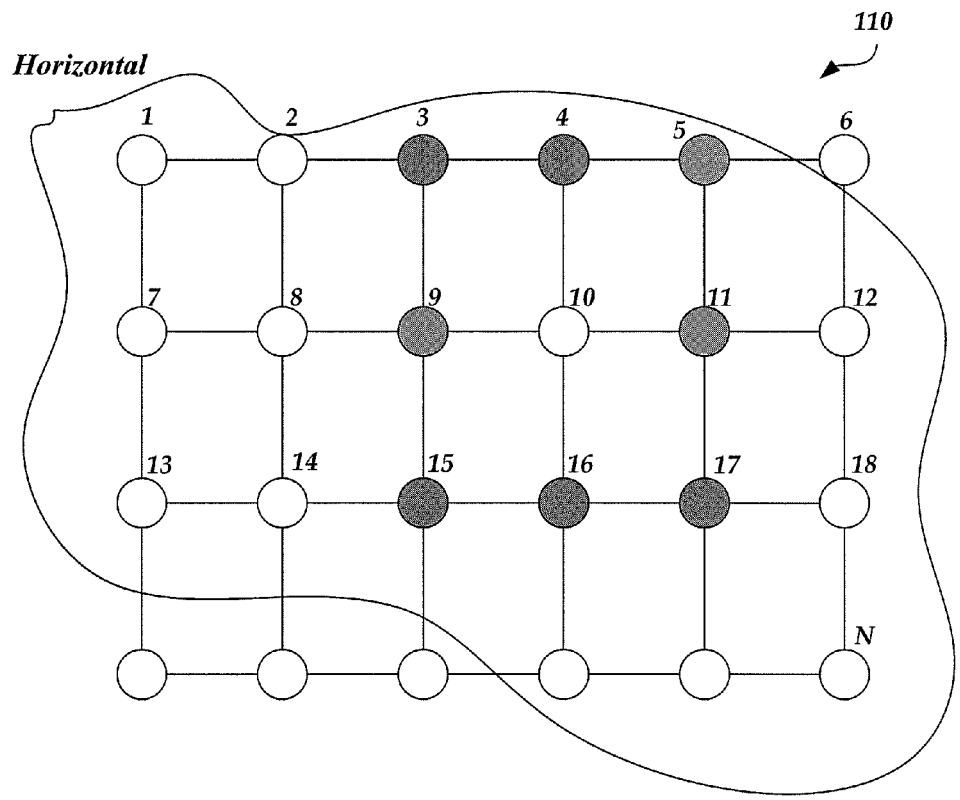
Figure 1B:
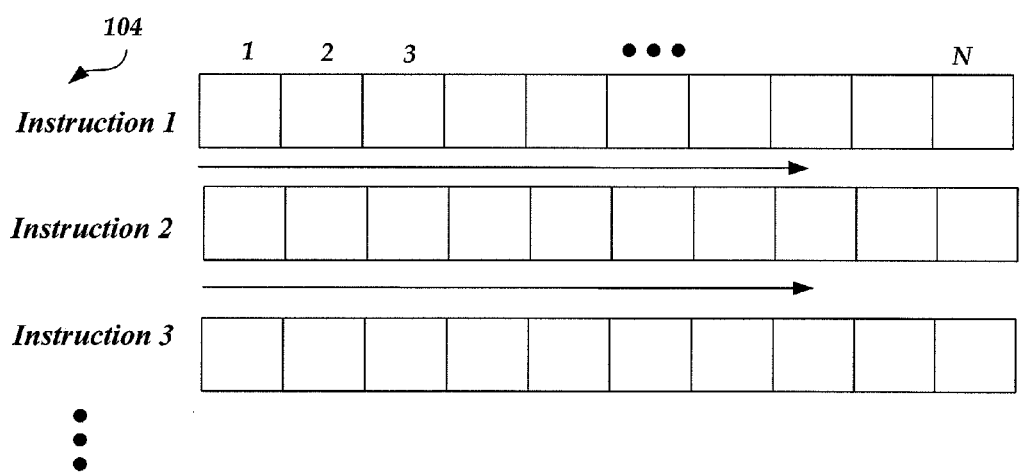

By the way of an example, consider another example of instructions as follows:
instruction 1: P'=f(P)
instruction 2: N'=calculatenormal (P')
input: a grid (an array of graphic data points)
Examples of horizontal instructions include, but are not limited to, shader instructions or calculations that require derivative information, such as Du, calculatenormal, texture, or the like. In the above-mentioned example, the instructions, filter (e.g., f(P)) and calculatenormal, are horizontal instructions. Referring to FIG. 1B, for example, when a data point, such as P10, is filtered (to get derivative estimation), the values of other data points, such as the values of the neighboring data points may need to be averaged. In this case, f(x) needs to be executed horizontally, i.e., executed on the data points in the grid, one data point at a time, before the next horizontal instruction, calculatenormal, can be implemented. In a shading operation, calculatenormal(p) generally returns the cross product of the surface tangent vectors in each direction. As shown, a horizontal instruction 104 is executed on each data point in the grid, one data point at a time, before another horizontal instruction 106 is executed. Thus, such instructions cannot be efficiently executed in parallel.

Figure 2A:
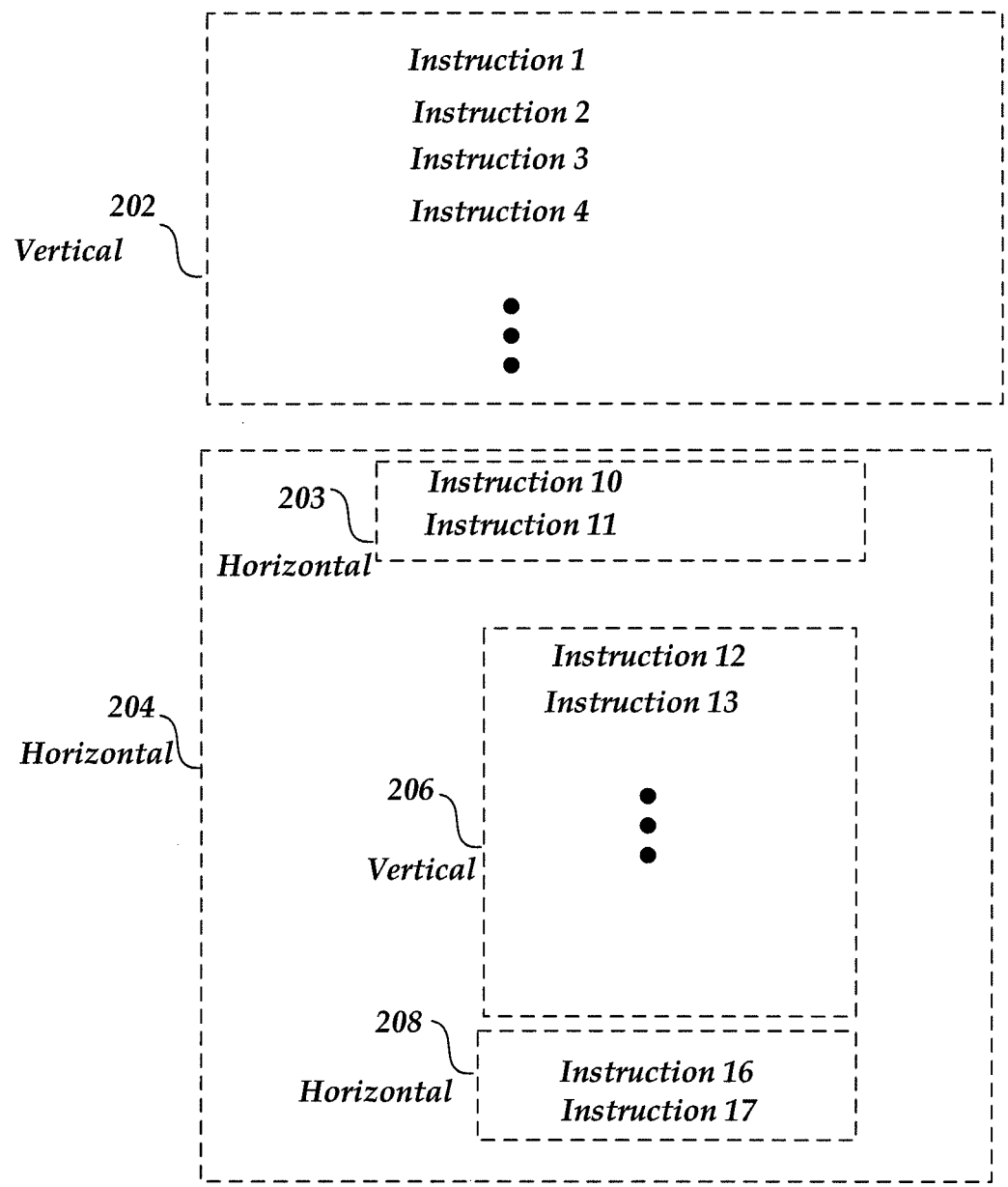
FIG. 2A, a simple pictorial diagram depicts a block of instructions that are divided into horizontal and vertical sub-blocks, which may be used to practice embodiments of the present invention.
Figure 2B:
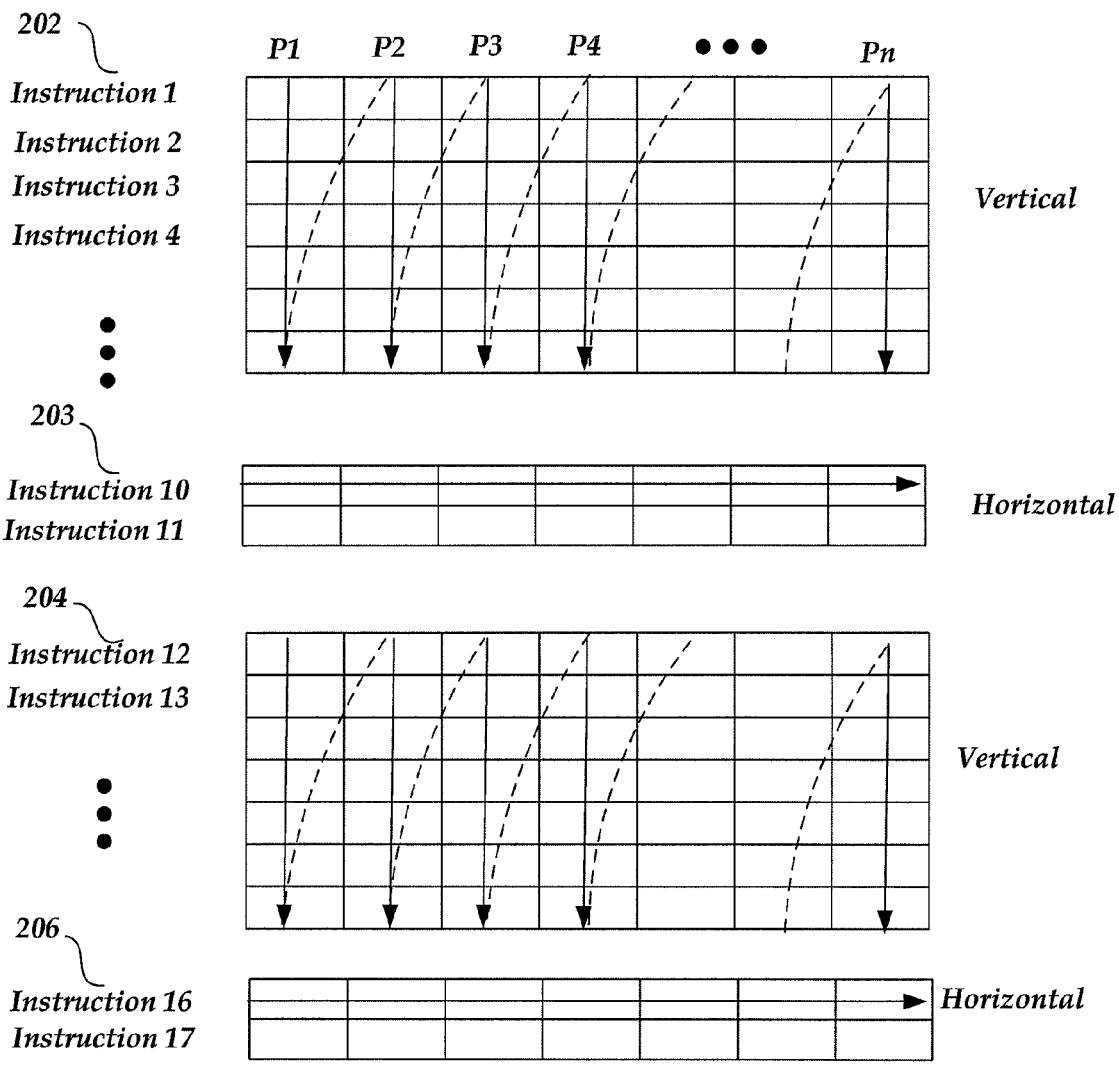
FIG. 2B is a simple pictorial diagram that depicts a way of executing the block of instructions on graphic data points after the block has been sub-divided, which may be used to practice embodiments of the present invention.

Referring now to FIG. 2A, a simple pictorial diagram depicts a block of instructions that are divided into horizontal and vertical sub-blocks. FIG. 2B is a simple pictorial diagram that depicts a way of executing the block of instructions on graphic data points after the block has been sub-divided, which may be used to practice embodiments of the present invention. It is noted that shader calculations and graphic data points are described herein for ease of discussion. Any type of instructions can be divided into vertical and horizontal sub-blocks as long as each instruction can be classified either a vertical or horizontal calculation. Thus, the depiction of the shader calculations or graphic data points should be taken as being illustrative in nature, and not as limiting to the scope of the disclosure.

As will be well appreciated, a shader can include a series of instructions, among which are horizontal instructions and vertical instructions. In one embodiment, vertical instructions are separated out from horizontal instructions and executed in a vertical manner, thereby reducing rendering time and utilizing cache space during the process. Further, a block of instructions is recursively subdivided until a number of instructions that are to be executed in a horizontal manner are approximately reduced to minimal (for example, one horizontal instruction) in each sub-block. Vertical sub-blocks may be executed on input data points in parallel for calculating. As such, such sub-divisions having many vertical sub-blocks make a near optimal use of parallel processing, pipelining, multithread processing or the like. As mentioned above, if instructions are executed in a vertical manner on an array of data points, the instructions can process each data point individually and independently from other data points. Thus, various advantages, including, but not limited to, temporary processing, index processing, efficient caching or the like are achieved. Further, a loop-overhead can be avoided or reduced.

As shown in FIG. 2A, a block 200 of instructions (instructions 1-17) are grouped into two blocks, such as a first vertical instruction block 202 (instructions 1-9) and a first horizontal instruction block 204 (instructions 10-17). Initially, a first horizontal portion may be identified within the block 200 and is used as a borderline of dividing the block. In one embodiment, a first vertical sub-block 202 is identified including all the vertical instructions that can be executed before the first identified horizontal portion. The rest of the instructions including the first horizontal portion in the block 200 are considered as a first horizontal sub-block 204. The first horizontal sub-block may start with a horizontal portion in a block. As will be understood, the first horizontal sub-block 204 can be further divided into other sub-blocks if some instructions in the sub-block can be implemented in a vertical manner. The first horizontal sub-block 204 is analyzed to separate out the horizontal instructions from a sub-block of instructions which begin with vertical instructions. Assume that instruction 10 and instruction 11 are horizontal instructions and an instruction 12 is a vertical one. Thus, the instructions 10-11 are separated out from the sub-block 204 that includes the rest of the instruction 12-17. The sub-block 204 including the rest of instructions (12-17) is recursively examined to identify a vertical portion (i.e., a vertical sub block 206) and a horizontal portion (i.e., horizontal sub block 208). Likewise, the horizontal sub-block 203 is examined to see if there is a vertical portion within the sub-block. Each horizontal portion may be analyzed to see if there are any instructions that can be executed in a vertical manner. As a result, the series of instructions are grouped into several vertical sub-blocks and horizontal sub-blocks which are mixed for execution. For each sub-block, the information about a sub-block including its calculation category, or the like is associated with the sub-block. When the shader is executed on an input data array such as a grid, the sub-block information of the shader may be referenced.

Referring now to FIG. 2B, the shader that has been analyzed to be divided into sub-blocks is executed on graphic data points (P1-PN). As shown, a first vertical block 202 (instruction 1-instruction 9) is executed in a vertical manner for each data point. After the execution of the first vertical block, each instruction in the following horizontal sub-block 203 (instruction 10, instruction 11) is executed in a horizontal manner. As mentioned above, each horizontal instruction is implemented across the data points, one data point at a time and a result of each calculation is stored for implementing a subsequent instruction on other data points. Subsequently, the next vertical sub-block (instructions 12-15) is implemented in a vertical manner and then the next horizontal sub-block (instructions 16-17) is implemented in a horizontal manner. As shown, as the numbers of instructions in each horizontal sub-block are minimized, (for example, each horizontal sub-block includes one or two horizontal instructions), the numbers of instructions that can be executed in a vertical manner are approximately maximized.

Figure 3:
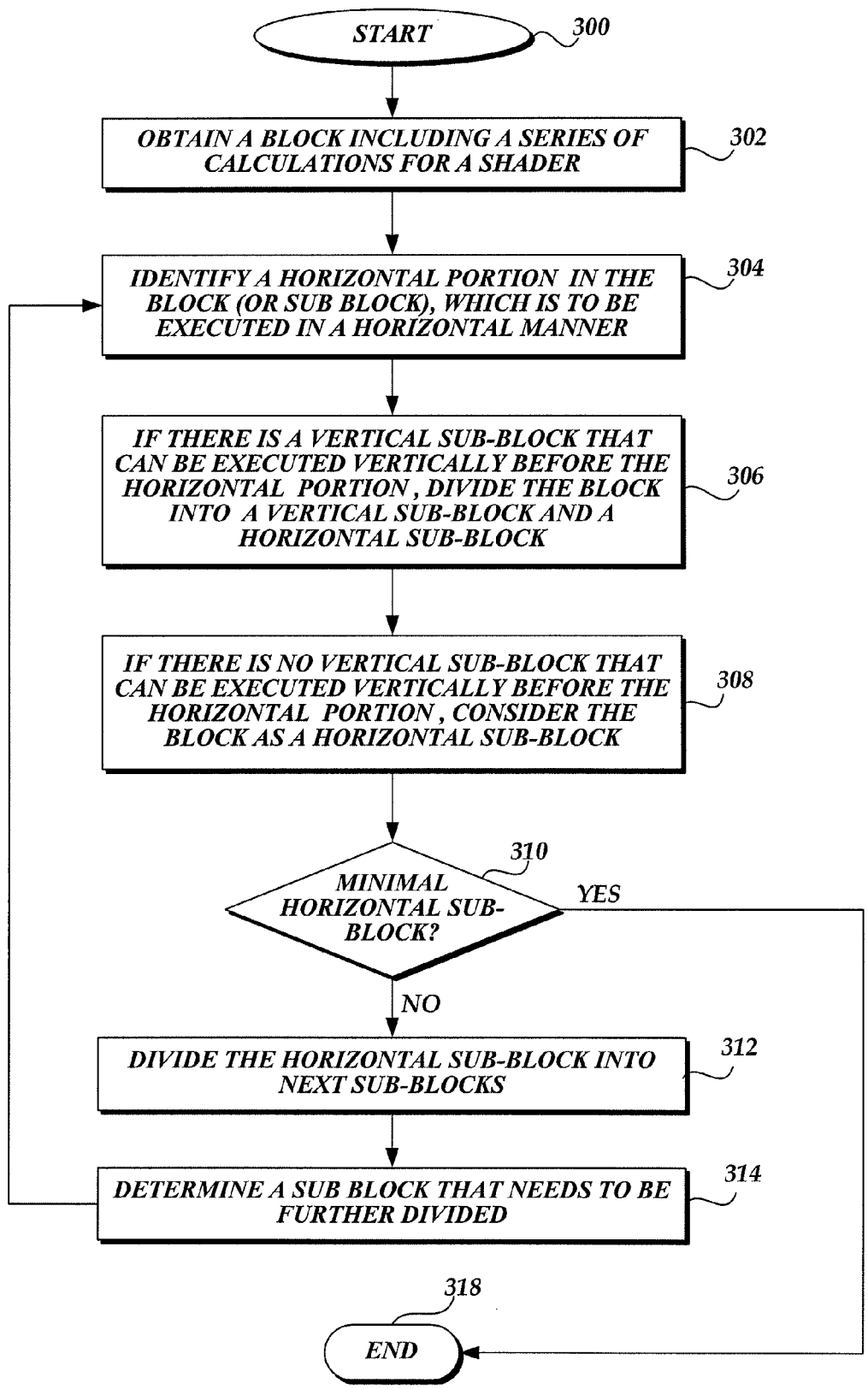
FIG. 3 is a flow diagram depicts a routine for dividing a series of instructions including horizontal and vertical instructions into sub-blocks, which may be used to practice embodiments of the present invention.

Referring now to FIG. 3, a flow diagram depicts a routine 300 for dividing a series of instructions including horizontal and vertical instructions into sub-blocks, which may be used to practice embodiments of the present invention. Conventionally, if there is a horizontal instruction mixed in vertical instructions in a shader, each instruction in the shader is treated as a horizontal instruction for accurate calculation. As discussed above, executing horizontal instructions is very expensive and time consuming. Execution of a horizontal instruction for rendering animation information may mean many redundant computations on millions of graphic data points. In some embodiments, a series of instructions in a shader is divided into several vertical and horizontal sub-blocks until each horizontal sub-block includes an approximately minimum number of instructions. As will be well appreciated, a shader may or may not have a horizontal instruction. Further, some horizontal instructions may need to be executed before all other instructions, or after some vertical instructions, or the like. It is noted that the dividing process can differ based on the mixed order instructions.

For the sake of discussion, it is assumed that a series of instructions are considered as a block of instructions that can be divided into several sub-blocks based on a set of rules. It is further assumed that a sub-block is associated with a calculation category (vertical or horizontal). That is, if each instruction in a sub-block is a vertical instruction, the sub-block is referred as a vertical sub-block. If at least one instruction in a sub-block needs to be executed in a horizontal manner, the sub-block is referred as a horizontal sub-block. For the sake of discussion, it is assumed that the routine 300 starts with a block of instructions where the instructions are to be executed in a certain order specified in the block. It is assumed that the resulting sub-blocks are arranged and executed in accordance with the order specified in the block.

Beginning with Step 302, the system obtains a block of instructions (hereinafter, block) including at least one horizontal instruction. The block of instructions can be a portion of a shader that is used to render an image or frame. The block of instructions, however, can include any instructions that can be categorized in either a vertical or horizontal instruction. At Step 304, the system identifies a first horizontal portion (sub-block) of instructions within the block that are to be executed in a horizontal way. For example, if there is a horizontal instruction within a loop instruction, the whole loop instruction is initially identified as a horizontal portion. In some cases, the series of instructions can start with a vertical portion and a horizontal portion that follows after the vertical portion. In such cases, the vertical portion (of a block), a series of instructions that can be executed in a vertical manner before executing a horizontal portion, becomes a vertical sub-block. The horizontal portion is a series of instructions for a given sub-block or block, which may not be executed in a vertical manner because it includes one or more horizontal instructions. In some embodiments, the horizontal portion can be further divided into next sub-blocks until the number of horizontal instructions becomes minimal. The vertical portion in a sub-block can be identified by determining a horizontal portion of the sub-block. In a typical embodiment, a final horizontal sub-block generally includes a single horizontal instruction.

At Step 306, the system determines if there is a vertical sub-block that can be executed before the horizontal portion of instructions and divide the block into two sub blocks: a vertical sub-block and a horizontal sub block including the horizontal portion and the rest of the instructions. At Step 308, the system determines if there is no vertical sub-block that can be executed before the horizontal portion of instructions, and determined if there is a vertical portion that follows after the horizontal portions of instructions and divides the block into two sub blocks: a horizontal sub-block and another sub block including the vertical portion and the rest of instructions. At decision Step 310, a determination is made as to whether each horizontal sub-block cannot be divided further, i.e., being a minimal horizontal sub-block.

If the sub-block is a vertical sub-block (including vertical instructions without any horizontal instruction), the sub-block does not need to be divided. However, if the sub-block includes a portion of horizontal instructions and vertical instructions, the sub-block is considered as a horizontal sub-block. For example, if there is a portion of vertical instructions that can be executed before a horizontal portion in a horizontal sub-block, such a portion of the vertical instructions and the rest of the instructions are divided into sub-blocks. Again, the rest of the instructions that can be further divided are generally considered as a horizontal sub-block. After a sub-block that needs to be further divided is determined at Step 312, the routine returns to Step 304 and repeats the above mentioned steps until all the horizontal sub-blocks have a minimal number of instructions, typically one or two horizontal instructions.

For example, within a horizontal sub-block, the system identifies a vertical instruction portion that can be executed before horizontal instructions. The system divides the horizontal sub-block into next sub-blocks, one block including the vertical instruction portion and the other sub-block (horizontal sub block) including the horizontal instructions. If there is no vertical instruction portion before the horizontal instructions, the system identifies a vertical portion that follows horizontal instructions. In such a case, the system also divides the sub-block into the next two sub blocks, a horizontal sub-block and another sub block including the vertical portion and the rest of instructions. As such, each sub-block is recursively analyzed if there is a portion of horizontal instructions, and then divided into several sub-blocks.

If it is determined at decision Step 308 that each horizontal sub-block is a minimal sub-block, i.e., no need to be further divided into sub-blocks, the routine completes at Step 318. The sub-blocks are labeled appropriately by corresponding calculation categories (either as a horizontal or vertical sub-block) and such information is stored.

Figure 4:
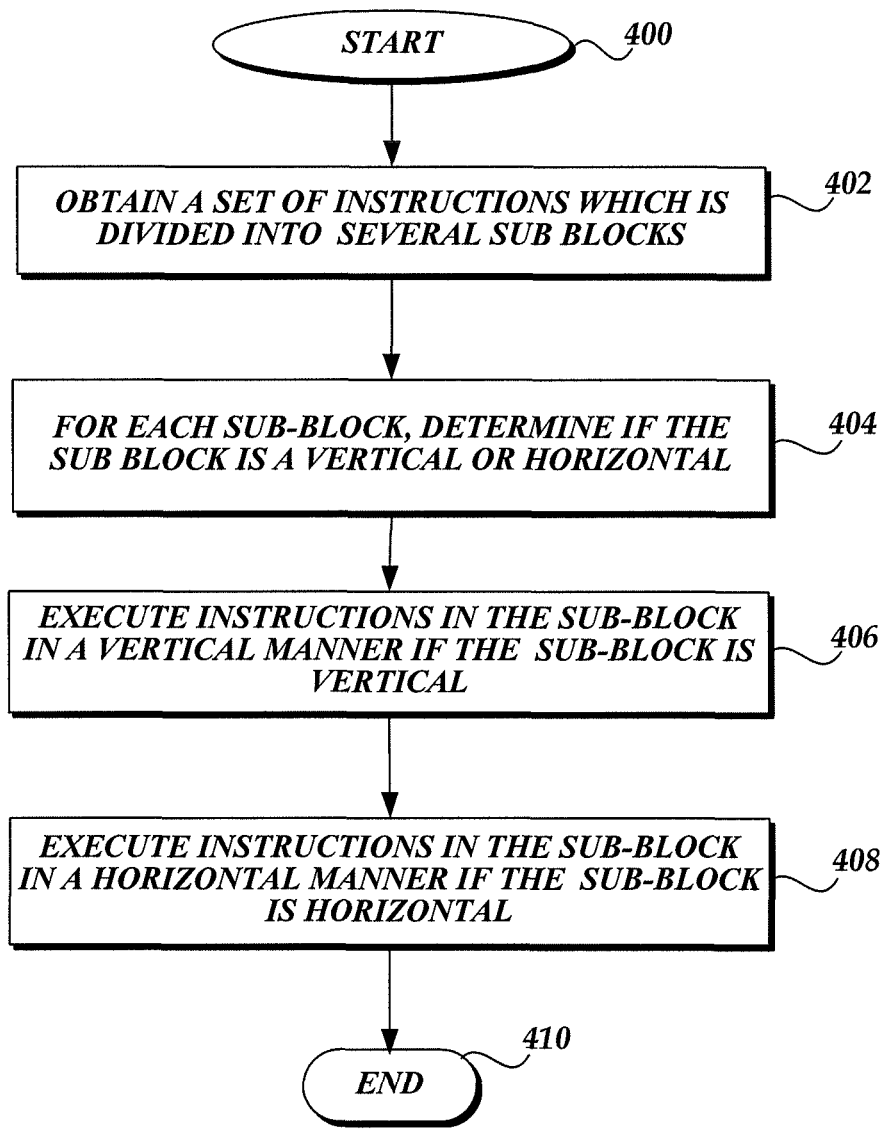
FIG. 4 is a flow diagram of executing the sub-blocks of instructions on input data points after the routine in FIG. 3 is implemented, which may be used to practice embodiments of the present invention.

Referring to FIG. 4, a flow diagram of executing the sub-blocks of instructions on indexed data points is depicted, which may be used to practice embodiments of the present invention. Assume that a series of instructions, such as a shader, have been analyzed and divided into vertical and/or horizontal sub-blocks as illustrated in FIG. 3. At Step 402, the system obtains a series of instructions that have been divided into several sub-blocks where the subdivision information is stored in a file. Subsequently, the system walks through each sub-block in order and obtains calculation category information about the sub-block from the subdivision information. At Step 404, for each sub-block, the system may determine if the sub-block is a vertical or horizontal one. At Step 406, the system executes instructions in the sub-block in a vertical manner if the sub-block is a vertical one. At Step 408, the system executes instructions in the sub-block in a horizontal manner if the sub-block is a horizontal one.

Although the above routines and embodiments are described in connection with a shader and shader instructions, it is noted that the described embodiments and routines, however, can be implemented with any type of instructions as long as the instructions can be executed in either a vertical or horizontal manner. In addition, the data points described herein merely for an exemplary purpose and thus not being construed as limiting. Thus the data points are any type of data or information that can be uniformly or individually processed by a set of vertical instructions.

Figure 5:
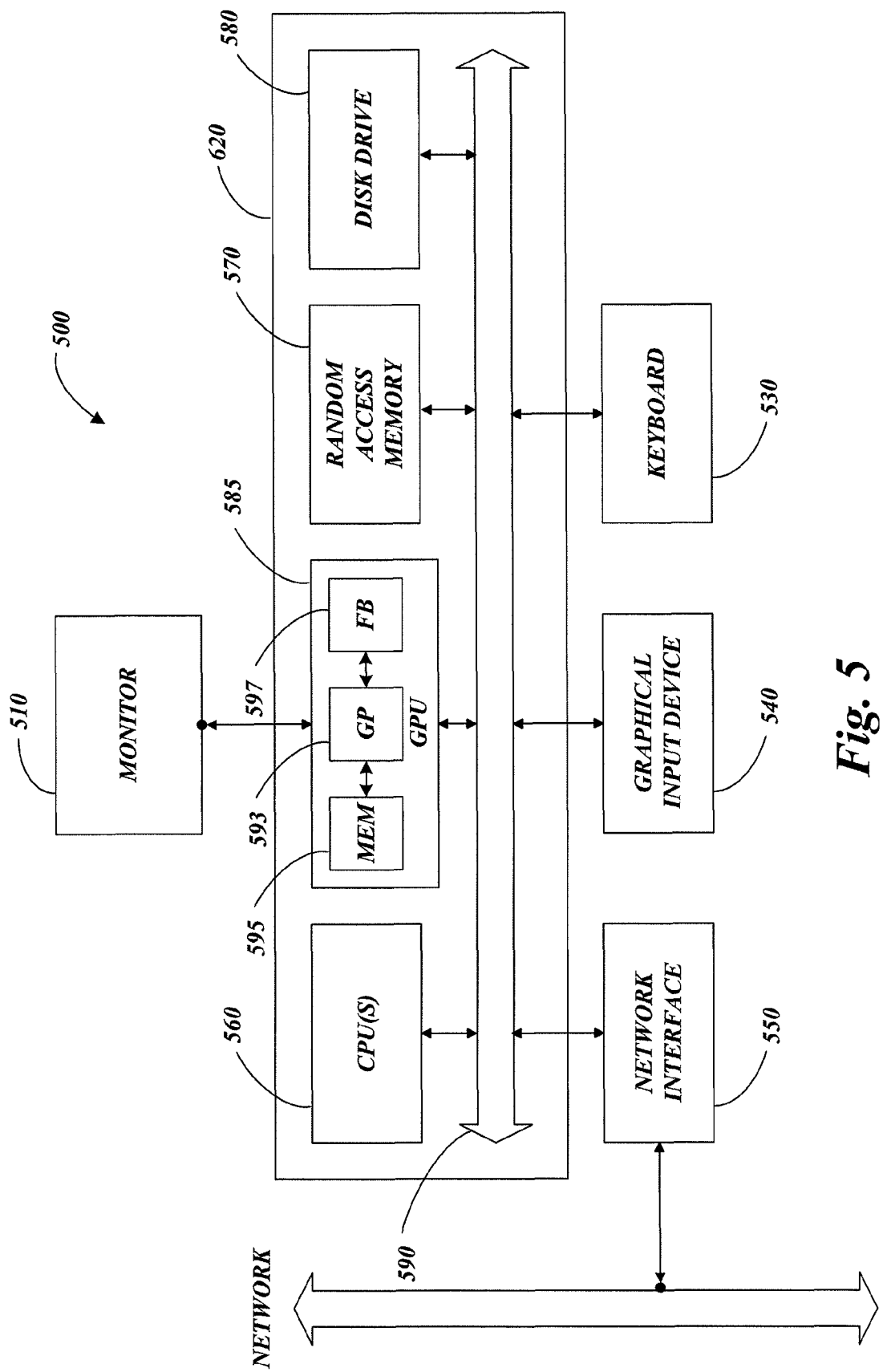
FIG. 5 is a simplified block diagram of a computer system that may incorporate embodiments of the present invention.

FIG. 5 is a block diagram of a computer system that may be used to practice embodiments of the present invention. FIG. 5 is merely illustrative of an embodiment incorporating the present invention and does not limit the scope of the invention as recited in the claims. One of ordinary skill in the art would recognize other variations, modifications, and alternatives.

In one embodiment, computer system 500 typically includes a monitor 510, computer 520, a keyboard 530, a user input device 540, computer interfaces 550, and the like.

In various embodiments, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the monitor 510 via a command such as a click of a button or the like.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520, and may be a software program, such as soft DSL, or the like.

In various embodiments, computer 520 typically includes familiar computer components such as a processor 560, and memory storage devices, such as a random access memory (RAM) 570, disk drives 580, a GPU 585, and system bus 590 interconnecting the above components.

In some embodiment, computer 520 includes one or more Xeon microprocessors from Intel. Further, one embodiment, computer 520 includes a UNIX-based operating system.

RAM 570 and disk drive 580 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 585 may be any conventional graphics processing unit that may be user programmable. Such GPUs are available from NVIDIA, ATI, and other vendors. In this example, GPU 585 includes a graphics processor 593, a number of memories and/or registers 595, and a number of frame buffers 597.

FIG. 5 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

It should be appreciated that the SIMD shading language interpreter may be implemented in GPU 585 and/or CPU 560, and that various steps of the methods disclosed herein may be implemented in GPU 585 and/or CPU 560.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for executing a block of calculations in shader code on indexed data points, the block including at least one vertical calculation and at least one horizontal calculation, the method comprising:
    detecting, with one or more processors associated with one or more computer systems, a horizontal portion in the block of calculations in the shader code, the horizontal block including a first instruction in a sequence of instructions to be executed on a first data point in the indexed data points using results from a second instruction in the sequence of instructions to be executed on a second data point in the indexed data point;
    dividing, with the one or more processors associated with one or more computer systems, the block of calculations in the shader code into a vertical sub-block and a horizontal sub-block using the horizontal portion as a dividing border, the vertical sub-block providing a sequence of instructions to be executed independently on each data point in the indexed data points;
    based on the horizontal sub-block including at least one vertical calculation, dividing, with the one or more processors associated with one or more computer systems, the horizontal sub-block such that vertical sub-blocks in the block of calculations in the shader code can be executed independently on each data point in the indexed data points; and
    storing information describing the sub-blocks of the block in a storage device associated with the one or more computer systems, the information including the calculation type of each sub-block.

2. The method of claim 1, further comprising:
    executing each sub-block on the indexed data points in accordance with the calculation type associated with the sub-block,
    wherein the sub-blocks are executed in accordance with an execution order specified in the block.

3. The method of claim 1, wherein dividing horizontal the sub-block comprises recursively dividing the sub-block until each resulting sub-block cannot be further divided.

4. The method of claim 1, wherein the horizontal sub-block starts with the detected horizontal portion.

5. The method of claim 1, wherein if the horizontal sub-block includes a vertical portion and a horizontal portion, the horizontal sub-block is divided further into another vertical sub-block and another horizontal sub-block.

6. The method of claim 1, further comprising:
    if the block starts with the detected horizontal portion:
    detecting a vertical portion that follows the horizontal portion; and
    dividing the block into two horizontal sub-blocks using the vertical portion as a dividing border.

7. The method of claim 6, further comprising:
    for each horizontal sub-block, if the horizontal sub-block includes at least one vertical calculation, dividing the sub-block, recursively, until each resulting sub-block cannot be further divided.

8. The method of claim 1, wherein the indexed data points comprise graphic data points.

9. The method of claim 8, wherein the horizontal calculation is one of a calculatenormal calculation, a texture calculation, a conditional calculation, or a loop statement calculation.

10. A system for executing a block of calculations in shader code on indexed data points, the block including at least one vertical calculation and at least one horizontal calculation, the system comprising:
    a processor; and
    a memory device including instructions that, when executed by the processor, cause the processor to:
    detect a horizontal portion in the block of calculations in the shader code, the horizontal block including a first instruction in a sequence of instructions to be executed on a first data point in the indexed data points using results from a second instruction in the sequence of instructions to be executed on a second data point in the indexed data point;

divide the block of calculations in the shader code into a vertical sub-block and a horizontal sub-block using the horizontal portion as a dividing border, the vertical sub-block providing a sequence of instructions to be executed independently on each data point in the indexed data points;

based on the horizontal sub-block including at least one vertical calculation, divide the horizontal sub-block, recursively, until each resulting sub-block cannot be further divided such that vertical sub-blocks in the block of calculations in the shader code can be executed independently on each data point in the indexed data points; and store information describing the sub-blocks of the block, the information including the calculation type of each sub-block.

11. The system of claim 10, wherein the memory device further includes instructions that, when executed by the processor, cause the processor to:

execute each sub-block on the indexed data points in accordance with the calculation type associated with the sub-block, wherein the sub-blocks are executed in accordance with an execution order specified in the block.

12. The system of claim 10, wherein the vertical sub-block includes one or more vertical calculations without any horizontal calculation.

13. The system of claim 10, wherein the memory device further includes instructions that, when executed by the processor, cause the processor to:

if the horizontal sub-block includes a vertical portion and a horizontal portion, divide the horizontal sub-block, recursively, until each resulting sub-block can not cannot be further divided.

14. The system of claim 10, wherein the memory device further includes instructions that, when executed by the processor, cause the processor to:

if the block starts with the detected horizontal portion:

detect a vertical portion that follows the horizontal portion; and divide the block into two horizontal sub-blocks using the vertical portion as a dividing border.

15. The system of claim 14, wherein the memory device further includes instructions that, when executed by the processor, cause the processor to:

for each horizontal sub-block, if the horizontal sub-block includes at least one vertical calculation, divide the sub-block, recursively, until each resulting sub-block cannot be further divided.

16. A non-transitory computer-readable medium storing code executable be a processor of a computer system for executing a shader including a group of calculations on a grid, the shader including at least one vertical calculation and at least one horizontal calculation, the non-transitory computer-readable medium comprising:

code for detecting a set of calculations in the shader that are to be executed in a horizontal manner, the set of calculations including a first calculation to be executed on a first data point in the grid using results from a second calculation to be executed on a second data point in the code for generating first information grouping calculations that can be executed in a vertical manner into a first set of calculations to be executed before the detected set of calculations;

code for generating information grouping calculations that are not in the first set of calculations into a second set of calculations;

code for executing the first set of calculations in a vertical manner based on the first information; and code for executing the second set of calculations based on the second information.

17. The non-transitory computer-readable medium of claim 16, wherein the code for executing the second set of calculations includes:

code for identifying a horizontal portion in the second set, wherein each instruction in the horizontal portion needs to be executed on the grid, one data point from the grid at a time; and code for dividing the second set of calculations, recursively, into sub-sets until each resulting sub-set includes a reduced number of horizontal calculations.

18. The non-transitory computer-readable medium of claim 17, further comprising: code for, based on a resulting sub-set includes vertical calculations without any horizontal calculation, executing the resulting sub-set in a vertical manner.

19. The non-transitory computer-readable medium of claim 17, further comprising: code for, based on a resulting sub-set includes a horizontal calculation, executing the resulting sub-set in a horizontal manner.

* * * * *

UNITED STATES PATENT AND TRADEMARK OFFICE
CERTIFICATE OF CORRECTION

PATENT NO. : 8,436,856 B1  
APPLICATION NO. : 12/614325  
DATED : May 7, 2013  
INVENTOR(S) : Thomas Douglas Selkirk Duff and Robert L. Cook Page 1 of 1

It is certified that error appears in the above-identified patent and that said Letters Patent is hereby corrected as shown below:

In the Claims

Column 11, line 36 should read:
"...until each resulting sub-block ~~can not~~ cannot be further divided."

Signed and Sealed this
Seventeenth Day of September, 2013

Teresa Stanek Rea
*Deputy Director of theUnited States Patent and Trademark Office*